United States Patent
Shiono et al.

(10) Patent No.: US 8,226,156 B2
(45) Date of Patent: Jul. 24, 2012

(54) REINFORCING ELEMENT STRUCTURE

(75) Inventors: Masamitsu Shiono, Wako (JP);
Kazuhiro Onda, Wako (JP); Hitoshi Kato, Wako (JP); Takashi Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 12/730,558

(22) Filed: Mar. 24, 2010

(65) Prior Publication Data
US 2010/0244489 A1    Sep. 30, 2010

(30) Foreign Application Priority Data

Mar. 26, 2009   (JP) .................................. 2009-077508

(51) Int. Cl.
*B60J 7/00* (2006.01)
(52) U.S. Cl. ................................. 296/193.02
(58) Field of Classification Search ............. 296/193.02, 296/186.1, 182.1, 181.1, 146.6, 29, 203.03, 296/187.12; 220/1.5
See application file for complete search history.

(56) References Cited

U.S. PATENT DOCUMENTS

| | | | | |
|---|---|---|---|---|
| 4,126,222 A * | 11/1978 | Aust | ........................... | 206/326 |
| 4,231,607 A * | 11/1980 | Bohlin | ............................ | 296/63 |
| 4,512,604 A * | 4/1985 | Maeda et al. | ................. | 296/68.1 |
| 4,514,008 A * | 4/1985 | Watanabe et al. | ............. | 296/204 |
| 5,000,509 A * | 3/1991 | Sinnhuber et al. | ........ | 296/187.12 |
| 5,407,244 A * | 4/1995 | Nakano et al. | ................ | 296/68.1 |
| 5,584,525 A * | 12/1996 | Nakano et al. | ................ | 296/68.1 |
| 5,897,155 A * | 4/1999 | Kerner et al. | ................. | 296/37.8 |
| 6,299,238 B1 * | 10/2001 | Takagi et al. | ............. | 296/187.12 |
| 6,299,239 B1 * | 10/2001 | Sagawa et al. | ............ | 296/187.12 |
| 6,705,671 B1 * | 3/2004 | Glovatsky et al. | ........ | 296/193.02 |
| 6,761,402 B1 * | 7/2004 | Muraishi | ..................... | 297/216.1 |
| 6,869,132 B2 * | 3/2005 | Wang et al. | .............. | 296/187.12 |
| 6,908,145 B2 * | 6/2005 | Joaquin et al. | ........... | 296/193.07 |
| 7,104,592 B2 * | 9/2006 | Song | ........................... | 296/187.12 |
| 7,246,845 B2 * | 7/2007 | Rashidy et al. | .......... | 296/187.12 |
| 7,328,938 B2 * | 2/2008 | Matsuda | .................. | 296/187.12 |
| 7,413,242 B2 * | 8/2008 | Rashidy et al. | .......... | 296/193.02 |
| 7,481,486 B2 * | 1/2009 | Rashidy et al. | .......... | 296/193.02 |
| 7,614,674 B2 * | 11/2009 | Shiono et al. | .............. | 296/24.34 |
| 7,753,437 B2 * | 7/2010 | Klimek | ..................... | 296/187.08 |
| 7,854,470 B2 * | 12/2010 | Yamaki et al. | ........... | 296/187.12 |
| 7,967,100 B2 * | 6/2011 | Cover et al. | .................... | 180/312 |
| 8,016,342 B2 * | 9/2011 | Durocher | ........................ | 296/72 |
| 8,033,602 B2 * | 10/2011 | Yamaki et al. | ........... | 297/216.13 |
| 8,052,205 B2 * | 11/2011 | Matsuyama | ............. | 296/193.07 |
| 8,075,049 B2 * | 12/2011 | Mendoza et al. | ............. | 296/204 |
| 2002/0153749 A1 * | 10/2002 | Lee | ................................ | 296/204 |

(Continued)

FOREIGN PATENT DOCUMENTS

JP        62-210151        9/1987

(Continued)

*Primary Examiner* — Kiran B Patel
(74) *Attorney, Agent, or Firm* — Rankin, Hill & Clark LLP (57) ABSTRACT

A reinforcing element structure placed between left and right seats. A reinforcing element comprises a pair of left and right side walls positioned so as to be disposed opposite from interior faces of a pair of left and right seats, and a reinforcing member for coupling the pair of left and right side walls. The pair of left and right side walls and the reinforcing member are jointly fastened to a tunnel section. A load that acts on the reinforcing element is transferred from one of the side walls to the other side wall via the reinforcing member. The load is withstood by a highly rigid reinforcing element constituted by the left and right side walls and the reinforcing member.

3 Claims, 7 Drawing Sheets

U.S. PATENT DOCUMENTS

| | | | |
|---|---|---|---|
| 2005/0264053 A1* | 12/2005 | Saberan et al. | 297/216.13 |
| 2006/0017310 A1* | 1/2006 | Joo et al. | 296/193.02 |
| 2008/0007089 A1* | 1/2008 | Bachmann | 296/187.08 |
| 2008/0315629 A1* | 12/2008 | Abe et al. | 296/193.07 |

FOREIGN PATENT DOCUMENTS

| | | |
|---|---|---|
| JP | 07-132777 | 5/1995 |
| JP | 2005-335523 | 12/2005 |
| JP | 2007-290579 | 11/2007 |

* cited by examiner

REINFORCING ELEMENT STRUCTURE

FIELD OF THE INVENTION

The present invention relates to an improvement in a reinforcing element structure placed between left and right seats.

BACKGROUND OF THE INVENTION

There is a known technique in which a collision load received from a side of a vehicle body when the vehicle is involved in a side collision is borne via a seat by a console box located between left and right seats to minimize deformation of the vehicle body and to preserve passenger space in the vehicle interior. A reinforcing member or the like is used to increase the rigidity of the console box.

Console boxes in which a reinforcing member is housed within the console box are known, such as the one disclosed in Japanese Patent Application Laid-Open Publication No. 62-210151. Furthermore, console boxes in which a reinforcing member is formed integrally in the lower section are also known, such as the one disclosed in Japanese Patent Application Laid-Open Publication No. 2005-335523.

Figure 10:
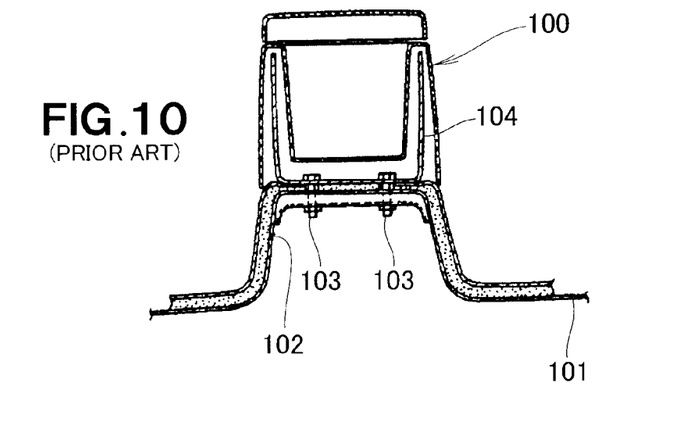
FIG. 10 is a cross-sectional view showing a first conventional reinforcing element structure.
Figure 11:
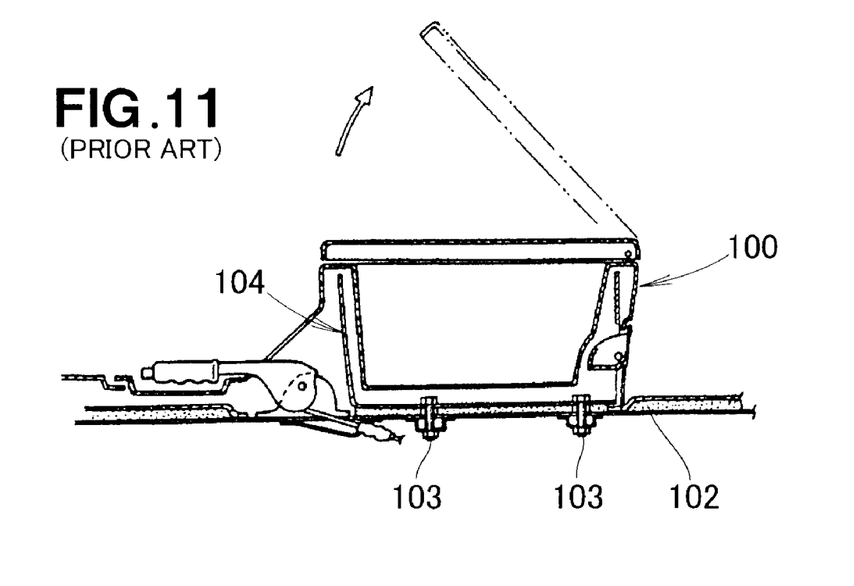
FIG. 11 is a longitudinal sectional view of the first conventional reinforcing element structure.

FIGS. 10 and 11 hereof show the console box disclosed in the 62-210151 publication.

A reinforcing member 104, which has a U shape in cross section and which opens upward on a tunnel section 102 of a floor panel 101, is mounted by a plurality of bolts 103 to the inner side of a center console 100, as shown in FIGS. 10 and 11.

Figure 12:
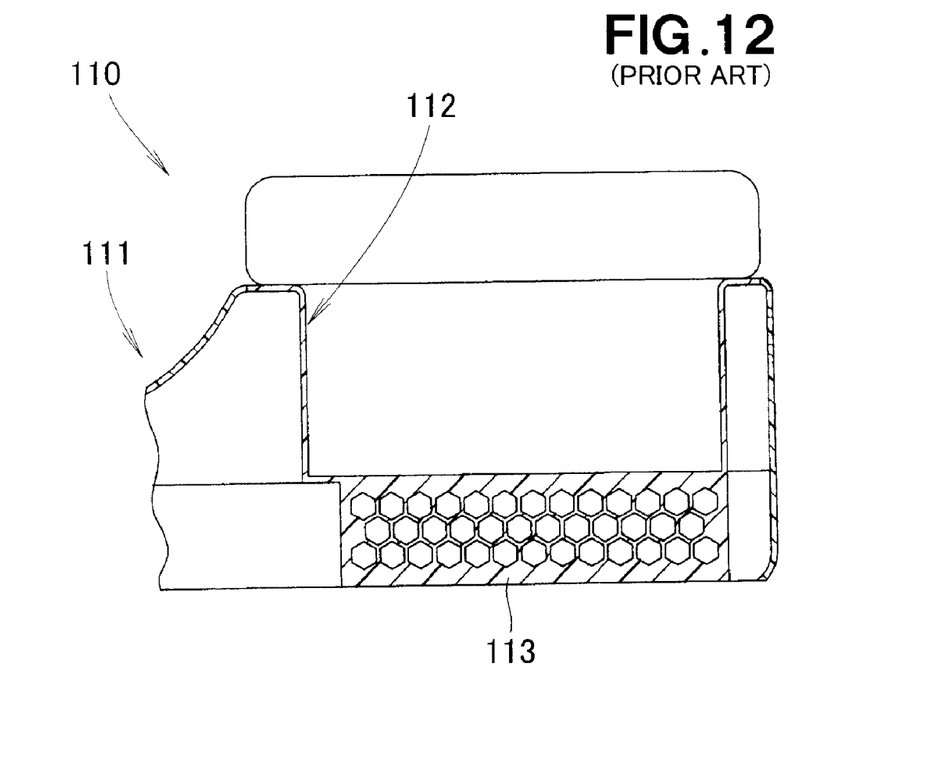
FIG. 12 is a cross-sectional view showing a second conventional reinforcing element structure.
Figure 13:
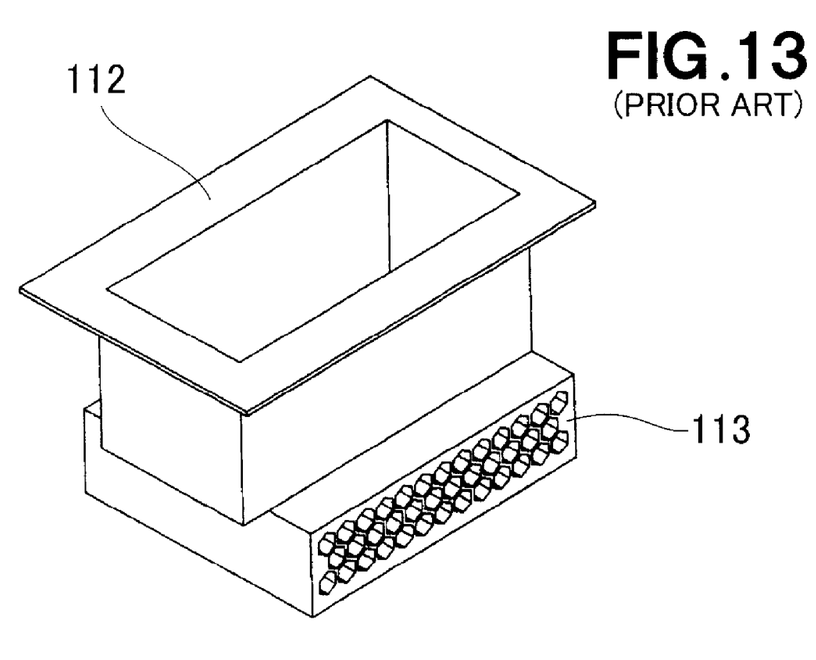
FIG. 13 is a perspective view showing the second conventional reinforcing element structure.

FIGS. 12 and 13 show the console box disclosed in the 2005-335523 publication.

The console box 110 comprises a main box 111, a storage component 112 provided in the center of the main box 111, and a reinforcing member 113 integrally molded in the lower section of the storage component 112, as shown in FIGS. 12 and 13.

The reinforcing member 104 shown in FIGS. 10 and 11 lacks rigidity because the upper section is open, and the reinforcing member 104 deforms readily, i.e., lacks the ability to sufficiently withstand a load when a load acts on the upper section of the reinforcing member 104 from a side.

In the console box 110 in FIGS. 12 and 13, rigidity is increased because the reinforcing member 113 is arranged so as to extend across the vehicle between the left and right side walls of the console box 110, and a load acting on the console box 110 is borne by both the left and right side walls and the reinforcing member 113. However, since the pair of side walls and the reinforcing member 113 are mounted separately to a floor tunnel or another member on the vehicle body, strength or thickness must be increased in the side walls and the reinforcing member 113 in order to further increase rigidity, which increases the weight.

SUMMARY OF THE INVENTION

An object of the present invention is to provide a lightweight reinforcing element structure in which rigidity can be maintained and a member on the vehicle body can be effectively used.

According to the present invention, there is provided a reinforcing element structure comprising: a pair of left and right side walls disposed in opposed relation to interior faces of a pair of left and right seats of a vehicle; and a reinforcing member for coupling the left and right side walls to each other, the reinforcing member extending transversely of the vehicle, wherein the left and right side walls and the reinforcing member are adapted to be jointly fastened to a member of the vehicle.

Coupling together the pair of left and right side walls by a reinforcing section extending across the vehicle allows any load acting upon the reinforcing element to be transmitted from one side wall to the other side wall via the reinforcing section. Therefore, the load is received by both the left and right side walls and the reinforcing section. Furthermore, since the reinforcing member extends across the vehicle, which is the direction in which the force is transmitted, the rigidity of the reinforcing section is increased, and the rigidity of the reinforcing element is therefore increased as well.

In addition, the pair of right and left side walls and the reinforcing section are jointly fastened to a member on the vehicle body. Therefore, a load is received by both the right and left side walls and the reinforcing section, and is transmitted to the member on the vehicle body in the joint fastening area.

Since the right and left side walls and the reinforcing section in the present invention are thus jointly fastened to the member on the vehicle body, a structure is provided in which a lateral collision load propagating from a seat is received by both the side walls and the reinforcing section and is transmitted to the member on the vehicle body in the joint fastening area, allowing the reinforcing element constituted by the side walls and the reinforcing section to have higher rigidity without an increase in weight. It is therefore possible to reduce the deformation of the vehicle body and to secure a space for occupants in the vehicle interior.

Preferably, the pair of right and left side walls is provided with sidewall flange sections extending outward across the vehicle from lower ends of each of the side walls, and reinforcing flange sections provided to lower ends of the reinforcing member so as to extend across the vehicle are inserted and jointly fastened between the sidewall flange sections and the member on the vehicle body. It is therefore possible to superpose and attach the reinforcing flange sections and the sidewall flange sections from above the floor of the vehicle body, which is the member on the vehicle body, and to make it easier to attach the side walls and the reinforcing section to the floor of the vehicle body.

Desirably, the reinforcing member is configured in a U-shape in cross section by a front wall section and a back wall section constituting a front and back pair and by an upper wall section for linking upper ends of the front wall section and the back wall section with each other, and the reinforcing flange sections are provided at lower ends of the front wall section and the back wall section. Rigidity can thus be increased by allowing a load applied across the vehicle to be received by three sides including the front wall section, back wall section, and upper wall section when the reinforcing member has a simple U-shape in cross section. Specifically, a highly rigid reinforcing element can be obtained using a reinforcing member having a simple and lightweight structure.

In a preferred form, the front wall section and the back wall section each have a lower end section disposed so as to expand beyond each upper end section in the longitudinal direction. A load transferred to a side wall is therefore received in a secure manner by the broadened reinforcing section. Because the reinforcing element can thus be reinforced over a broad longitudinal area of the reinforcing member, a lateral collision load transferred from the seats can be reliably withstood by the reinforcing element even if the seats have moved or deformed.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
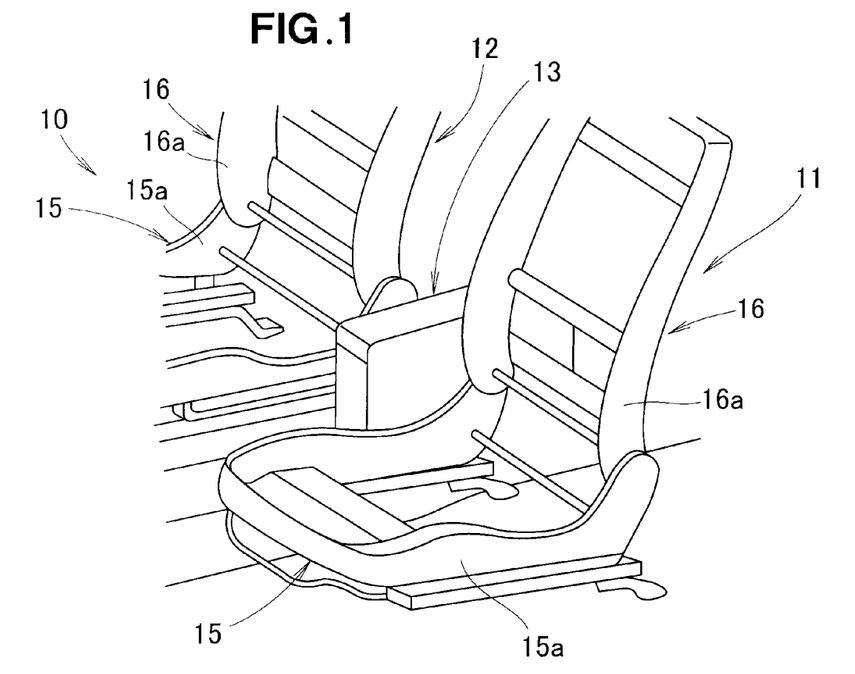
FIG. 1 is a perspective view showing a cabin provided with a reinforcing element structure according to the present invention.

As shown in FIG. 1, left and right seats 11, 12, which are front seats, are located in the vehicle interior 10, and a console box 13 is located between the left and right seats 11, 12.

The left seat 11 has a seat cushion 15 for seating a passenger, and a seatback 16 attached to a back part of the seat cushion 15 so as to be able to swing forward and backward. FIG. 1 shows only a seat cushion frame 15a constituting the seat cushion 15, and a seatback frame 16a constituting the seatback 16. The right seat 12 is the same as the left seat 11.

Figure 2:
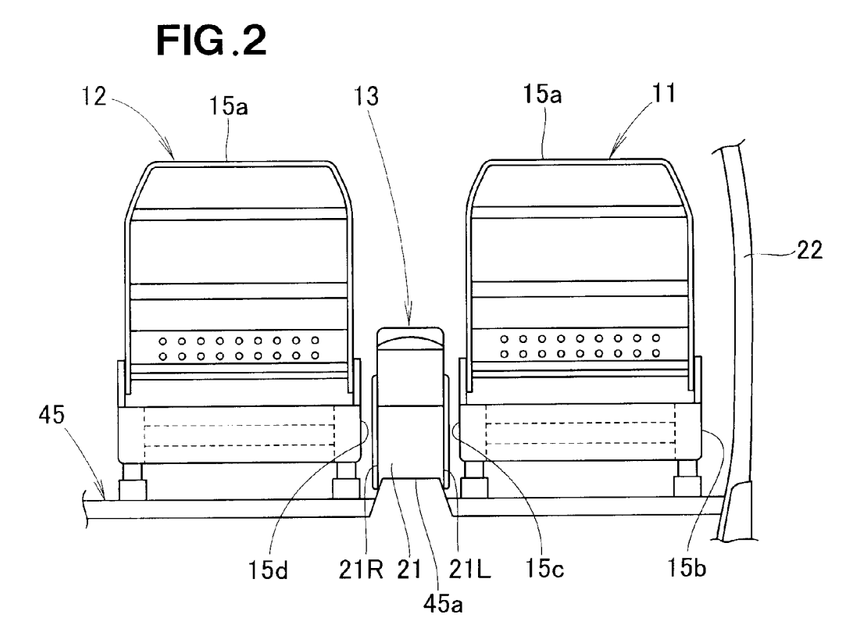
FIG. 2 is a front view showing the left and right seats and the console box of FIG. 1.

As shown in FIG. 2, a reinforcing element 21 for receiving the load transmitted to the left seat 11 or the right seat 12 is attached to the lower part of the console box 13.

A center pillar 22 constituting a side body is positioned opposite from an exterior face 15b of the seat cushion frame 15a; a left-side surface 21L of the reinforcing element 21 is disposed opposite from the interior face 15c of the seat cushion frame 15a; and a right-side surface 21R of the reinforcing element 21 disposed opposite from the interior face 15d of the seat cushion frame 15a in the right seat 12.

Figure 3:
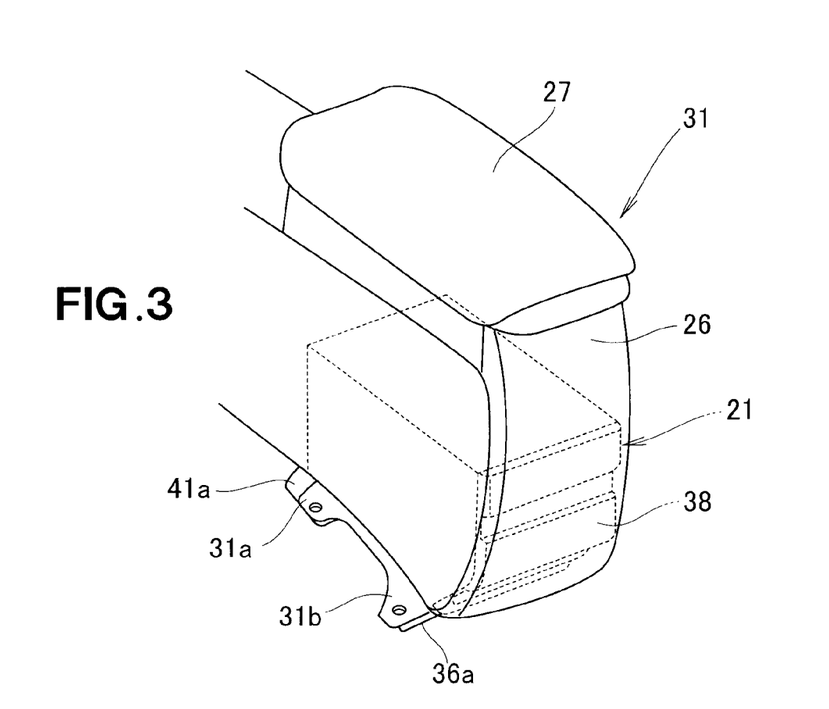
FIG. 3 is a perspective view of the console box shown in FIG. 2.

As shown in FIG. 3, the console box 13 has a console box body 26 made of resin and a lid 27 attached along the edge of the opening in the upper part of the console box body 26 so as to be able to open and close; and the reinforcing element 21 is placed inside the lower part of the console box body 26. The console box body 26 is shaped so as to cover the reinforcing element 21 substantially completely, and the reinforcing element 21 has minimal visibility from the outside.

Figure 4:
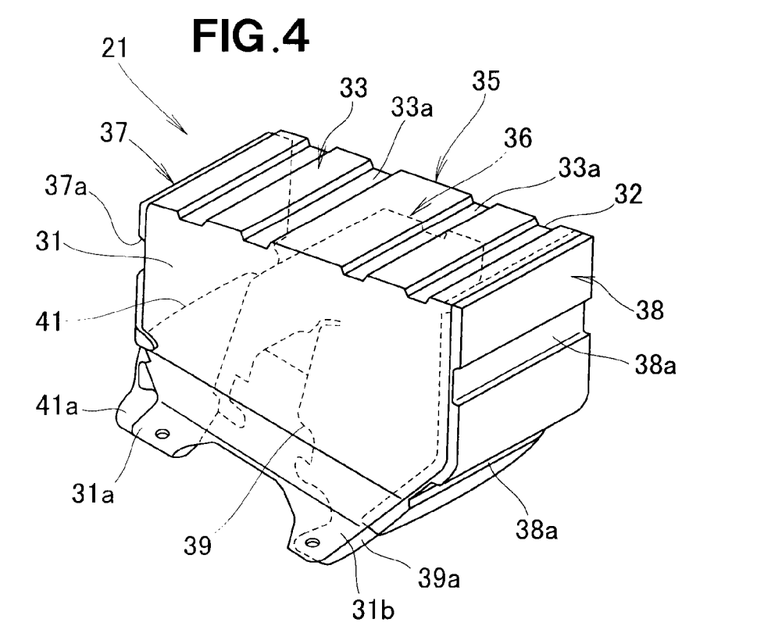
FIG. 4 is a perspective view of the reinforcing element shown in FIG. 3.

As shown in FIG. 4, the reinforcing element 21 has a cross-sectionally U-shaped outer member 35 configured from left and right side walls 31, 32 and an upper wall 33 joined to the upper ends of the side walls 31, 32, and a reinforcing member 36 for connecting the side walls 31, 32 of the outer member 35 together and reinforcing the outer member 35. Symbols 37, 38 indicate covering members attached to the outer member 35 in order to cover up the front and rear openings in the outer member 35. The reinforcing member 36 is installed by being inserted into the front and rear openings in the outer member 35.

The upper wall 33 and the covering members 37, 38 are provided with a plurality of beads 33a, 37a, 38a, which are grooves formed by being embossed so as to extend across the vehicle in order to increase rigidity.

The reinforcing member 36 has a main reinforcing element 39 and a front coupling member 41 attached to the front end of the main reinforcing element 39.

Figure 5:
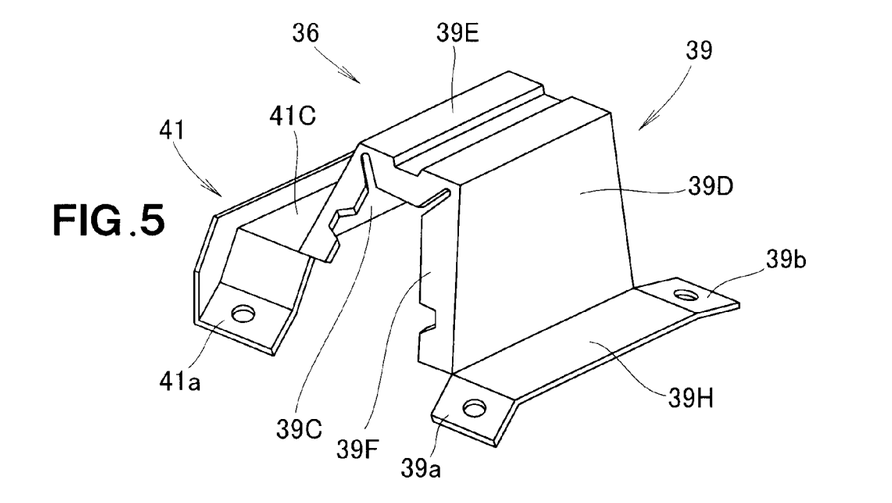
FIG. 5 is a perspective view of a reinforcing member built into the reinforcing element shown in FIG. 4.

The main reinforcing element 39 of the reinforcing member 36 has a front wall section 39C and a back wall section 39D provided in the front and back, an upper wall section 39E for integrally linking the upper end sections of the front wall section 39C and the back wall section 39D, a horizontal back section 39H extending backward from the lower end sections of the back wall section 39D, and flange sections 39a, 39b projecting sideways to the left and right from the left and right sides of the horizontal back section 39H, as shown in FIG. 5. An inside mounting section 39F (only one side is shown) is formed integrally with the left edge sections and right edge sections of the front wall section 39C, back wall section 39D, and upper wall section 39E; and the inside mounting section 39F is joined to the inside surfaces of the side walls 31, 32 of the outer member 35 (FIG. 4).

The front coupling member 41 is integrally provided with a front horizontal section 41C extending to the front and back, and flange sections 41a, 41b (see FIG. 8) projecting sideways to the left and right from the left and right sides of the horizontal front section 41C. The back end of the horizontal front section 41C is attached to the lower end of the front wall section 39C of the main reinforcing element 39.

Figure 6:
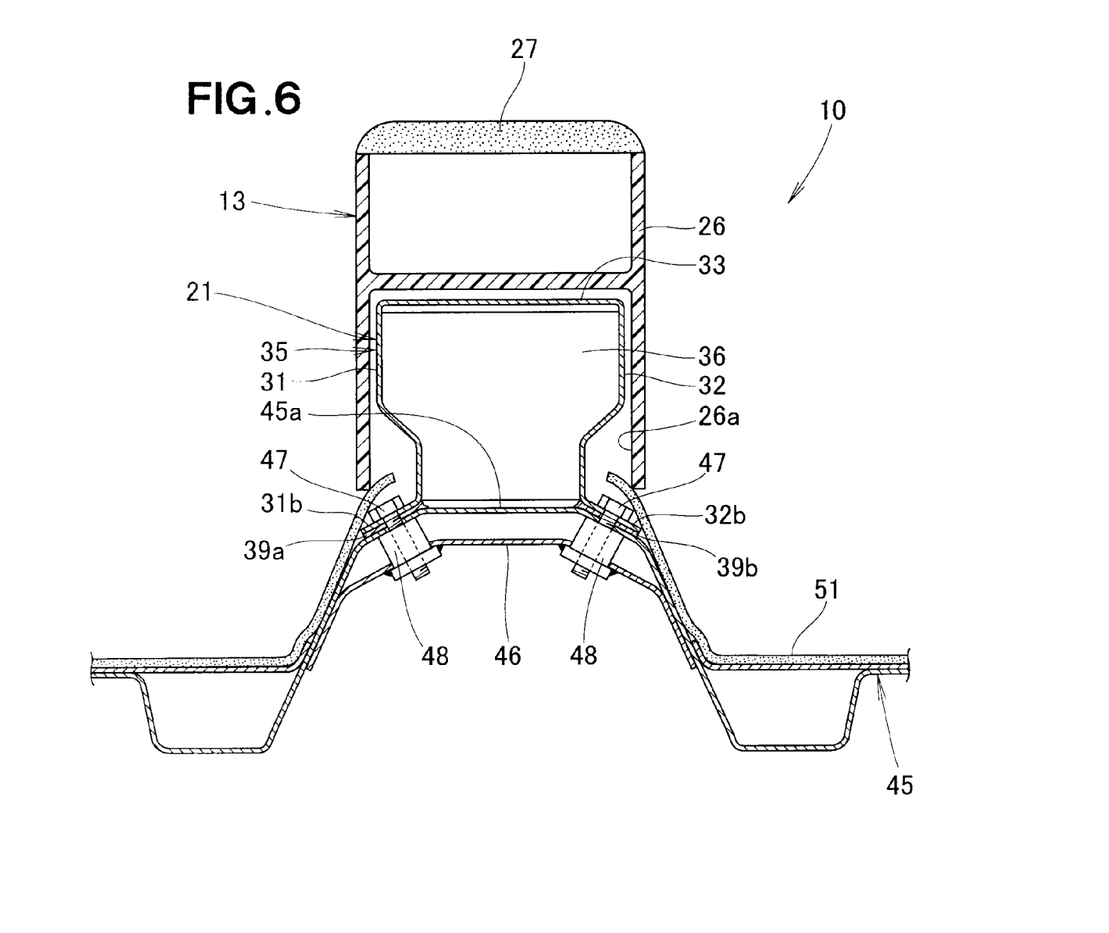
FIG. 6 is a cross-section view of the reinforcing element structure according to the present invention.

The console box 13 is disposed above a tunnel section 45a formed in the crosswise center of a floor 45 of the vehicle interior 10, as shown in FIG. 6.

The reinforcing element 21 is disposed inside a bottom concave section 26a formed in the lower part of the main console element 26 of the console box 13, and is mounted on the upper surface of the tunnel section 45a.

In the structure for mounting the reinforcing element 21, specifically, a reinforcing panel 46 is attached to the underside of the tunnel section 45a as a member on the vehicle body, a plurality of nuts 48 is attached to the underside of the reinforcing panel 46, a bolt 47 is inserted at an angle from above through a bolt insertion hole formed in the flange section 39a of the reinforcing member 36 and the flange section 31b of the outer member 35 in the reinforcing element 21, the bolt 47 is passed through the tunnel section 45a and the reinforcing panel 46, and the distal end of the bolt 47 is threaded through a nut 48. Similarly, a bolt 47 is inserted at an angle from above through a bolt insertion hole formed in the flange section 39b of the reinforcing member 36 and the flange section 32b of the outer member 35 in the reinforcing element 21, the bolt 47 is passed through the tunnel section 45a and the reinforcing panel 46, and the distal end of the bolt 47 is threaded through a nut 48.

The description above also applies to fastening the other flange parts of the outer member 35 and the reinforcing member 36 to the tunnel section 45a and the reinforcing panel 46. The distance between the tunnel section 45a and the reinforcing panel 46 is maintained by the nuts 48. Symbol 51 indicates a mat placed on the floor 45.

Figure 7:
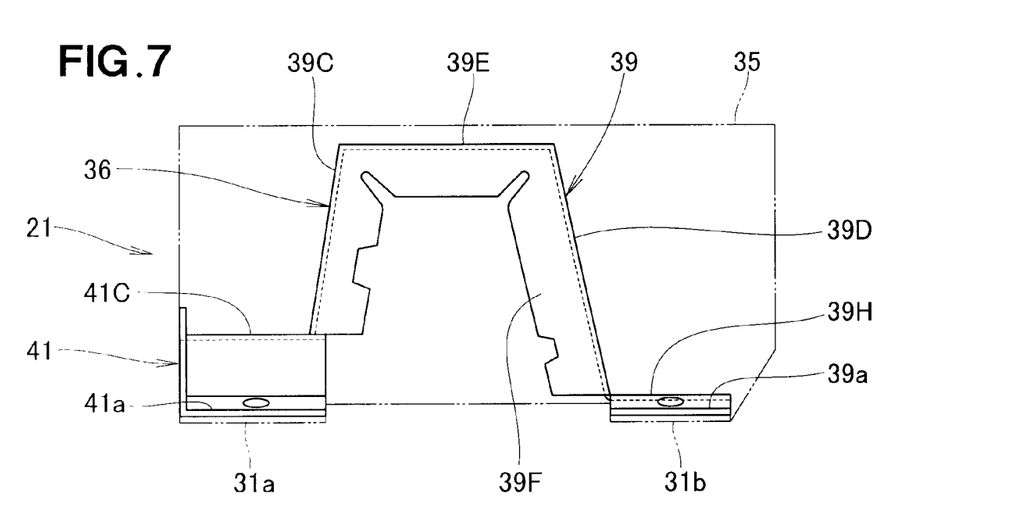
FIG. 7 is a side view of the reinforcing member shown in FIG. 5.

The main reinforcing element 39 is formed so that the front wall section 39C, the back wall section 39D, and the upper wall section 39E constitute a U shape in cross section as shown in FIG. 7; the inside mounting section 39F is joined to the inside faces of both side walls 31, 32 (FIG. 4) of the outer member 35, and the lower end of the front wall section 39C is mounted on the front coupling member 41.

The front wall section 39C is inclined so that the lower end is positioned farther forward than the upper end, and the back wall section 39D is inclined so that the lower end is positioned farther rearward than the upper end. In other words, the lower ends of both the front wall section 39C and the back wall section 39D of the main reinforcing element 39 are formed so as to broaden forward and backward farther out than the respective upper ends.

Thus, the front and back dimensions of the lower ends of the main reinforcing element 39 are greater than the front and back dimensions of the upper ends, forming a trapezoidal shape, whereby the profile area of the main reinforcing element 39 from the side can be increased, and a lateral load can be reliably withstood over a greater surface area.

Figure 8:
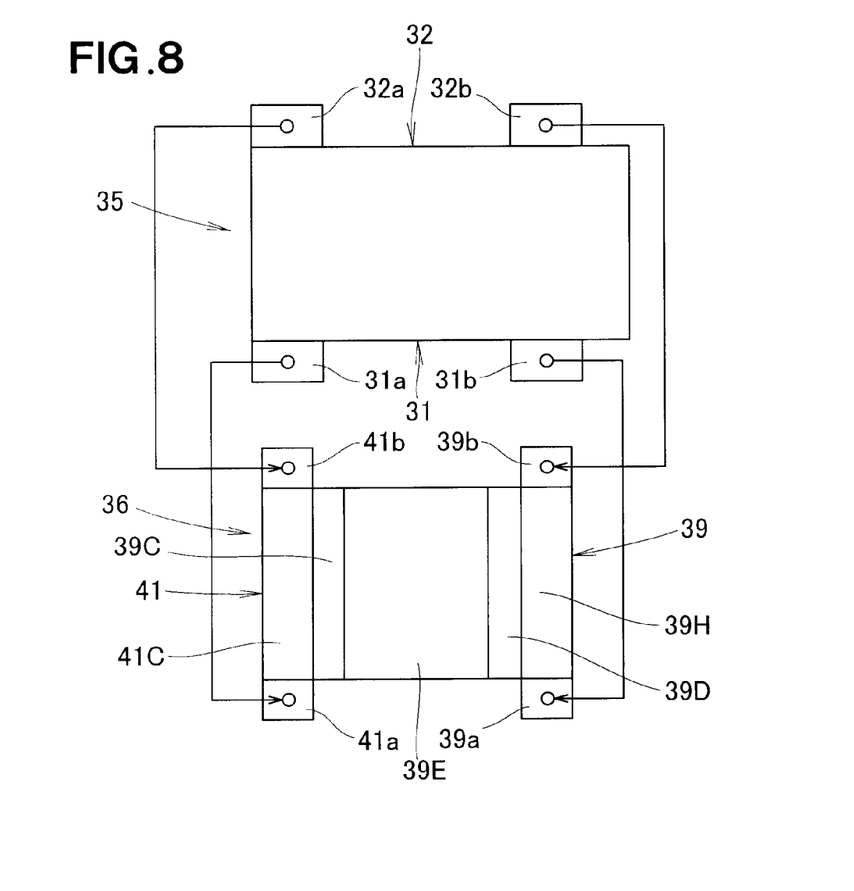
FIG. 8 is a plan view showing the relationship between the reinforcing member and external members.

The outer member 35 is integrally provided with flange sections 31a, 31b protruding sideways from the lower end of the side wall 31, and with flange sections 32a, 32b protruding sideways from the lower end of the side wall 32, as shown in FIG. 8.

The main reinforcing element 39 integrally comprises a horizontal back section 39H extending rearward from the lower end of the back wall section 39D along the top face of the tunnel section 45a (FIG. 6), and flange sections 39a, 39b extending sideways to the left and right from the left and right sides of the horizontal back section 39H. The front coupling member 41 integrally comprises a front horizontal section 41C extending forward from the lower end of the front wall section 39C along the top face of the tunnel section 45a, and flange sections 41a, 41b extending sideways to the left and right from the left and right sides of the front horizontal section 41C.

The front flange sections 31a, 32a of the outer member 35 are superposed over the front flange sections 41a, 41b, respectively, of the reinforcing member 36; the rear flange sections 31b, 32b of the outer member 35 are superposed over the rear flange sections 39a, 39b of the reinforcing member 36; the bolts 47 (FIG. 6) are inserted through the bolt insertion holes of the flange sections; and the distal ends of the bolt 47 are threaded through the nuts 48 (FIG. 5) and are jointly fastened to the tunnel section 45a (FIG. 5).

The action of the reinforcing element 21 described above will now be described.

Figure 9:
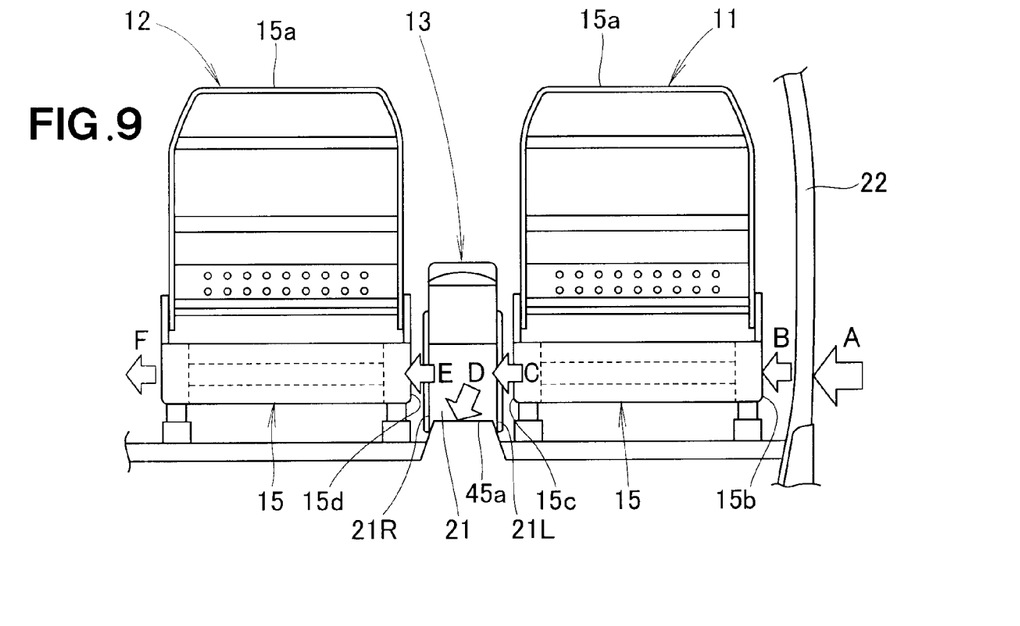
FIG. 9 is a view showing the manner in which a load is transmitted in a side collision in which the load is applied to the reinforcing element structure according to the present invention.

In FIG. 9, when another vehicle collides with the center pillar 22 from the side and a collision load acts as shown by arrow A, the center pillar 22 deforms inward of the vehicle body as shown by arrow B, coming in contact with the exterior face 15b of the seat 11 and transmitting the collision load to the seat cushion frame 15a.

As a result, the seat cushion frame 15a moves inward of the vehicle body as shown by arrow C, the interior face 15c of the left seat 11 comes in contact with the left-side surface 21L of the reinforcing element 21, and the collision load is transmitted to the reinforcing element 21.

The reinforcing element 21 thereby bears the collision load, some of the collision load is transferred to the tunnel section 45a of the floor as shown by arrow D, the reinforcing element 21 moves sideways as shown by arrow E, the right-side surface 21R of the reinforcing element 21 comes in contact with the interior face 15d of the adjacent seat 12, and the collision load is transferred to the right seat 12.

Furthermore, the seat cushion frame 15a of the right seat 12 moves toward the outside and comes in contact with the adjacent center pillar as shown by arrow F, and the collision load is transferred to this center pillar.

Thus, providing the reinforcing element 21 between the left and right seats 11, 12 makes it possible for the collision load to be borne by the reinforcing element 21 and for the displacement of the center pillar 22 and the left seat 11 to be minimized.

Since the reinforcing element 21 comes in contact with the adjacent right seat 12 and is supported by the right seat 12 and, indirectly, by the center pillar in proximity to the right seat 12, the movement and deformation of the reinforcing element 21 can be minimized, and the displacement of the center pillar 22 and the left seat 11 can be minimized even further.

The reinforcing element 21 has a structure comprising a pair of left and right side walls 31, 32 disposed opposite from the interior faces 15c, 15d of the pair of left and right seats 11, 12, and a reinforcing member 36 as a reinforcing part which couples the side walls 31, 32 with each other and extends across the vehicle, as shown in FIGS. 2 and 5, with the pair of left and right side walls 31, 32 and the reinforcing member 36 being jointly fastened to the floor 45, which functions as a member on the vehicle body. The structure is therefore designed so that a side collision load transferred from the seats 11, 12 is borne by both the side walls 31, 32 and the reinforcing member 36 and is transmitted to the member on the vehicle body at the jointly fastened locations, i.e., to the tunnel section 45a of the floor 45. The rigidity of the reinforcing element 21 can therefore be increased without increasing the weight of the reinforcing element 21 constituted by the side walls 31, 32 and the reinforcing member 36. Accordingly, deformation of the vehicle body can be minimized, and the passenger space in the vehicle interior 10 can be preserved.

Flange sections 31a, 31b, 32a, 32b as side wall flange sections extending outward across the vehicle are provided at the lower ends of the pair of left and right side walls 31, 32. Inserted and jointly fastened between these flange sections 31a, 31b, 32a, 32b and the floor 45 (specifically, the tunnel section 45a), which functions as a member on the vehicle body, are the flange sections 39a, 39b, 41a, 41b as reinforcing flange sections provided at the lower ends of the reinforcing member 36 and made to extend across the vehicle, as shown in FIGS. 5 and 7. Therefore, the flange sections 41a, 39a, 41b, 39b and the flange sections 31a, 31b, 32a, 32b can be respectively superposed and fastened together on top of the tunnel section 45a, and the side walls 31, 32 and reinforcing member 36 can be easily fastened to the floor 45.

The reinforcing member 36 is formed so that the front wall section 39C and back wall section 39D constituting a front and back pair, as well as the upper wall section 39E for linking upper ends of the front wall section 39C and back wall section 39D with each other, form a U shape in cross section, and the flange sections 41a, 41b, 39a, 39b are provided at lower ends of the front wall section 39C and the back wall section 39D, as shown in FIGS. 6 and 7. Therefore, a highly rigid reinforcing element 21 can be formed with a simple and lightweight structure for the reinforcing member 36.

Since the respective lower ends of the front wall section 39C and the back wall section 39D are arranged so as to broaden farther longitudinally outward than the respective upper ends in the manner shown in FIG. 6, the reinforcing element 21 can be reinforced over a greater longitudinal range of the reinforcing member 36, and a lateral collision load transferred from the left and right seats 11, 12 can therefore be reliably withstood by the reinforcing element 21 even if the seats 11, 12 (see FIG. 1) have moved.

Obviously, various minor changes and modifications of the present invention are possible in light of the above teaching. It is therefore to be understood that within the scope of the appended claims the invention may be practiced otherwise than as specifically described.

What is claimed is:

1. A reinforcing element, which is received in a lower part of a resinous center console disposed on a tunnel section, the tunnel section being formed on a floor of a vehicle at a transversely central position of the floor between left and right seats in a passenger compartment, said reinforcing element being configured to bear a load transmitted from the seats and, the reinforcing element structure comprising:

an outer member having a pair of left and right side walls and an upper wall connecting upper ends of the side walls to form the outer member into a U-shape; and a reinforcing member extending transversely of the vehicle for connecting the side walls together to reinforce the outer member, wherein the left and right side walls have respective side wall flange sections extending transversely outwardly of the vehicle from respective ends thereof, the reinforcing member has reinforcing flange sections provided at lower ends thereof and extending transversely of the vehicle, and the reinforcing flange sections are inserted between the side wall flange sections and the tunnel section and fastened together with the latter.

2. The reinforcing element of claim 1, wherein the reinforcing member is configured into a U-shape in cross section by a front wall section and a back wall section constituting a front and back pair and by an upper wall section for linking upper ends of the front wall section and the back wall section with each other, and the reinforcing flange sections are provided at lower ends of the front wall section and the back wall section.

3. The reinforcing element of claim 2, wherein the front wall section and the back wall section each have a lower end section disposed so as to expand beyond each upper wall section in a longitudinal direction.

* * * * *